United States Patent
Matsui et al.

(10) Patent No.: US 6,729,761 B2
(45) Date of Patent: May 4, 2004

(54) LINEAR MOTION GUIDE UNIT WITH JOINT TUBE BETWEEN RETURN PASSAGE AND TURNAROUND

(75) Inventors: Takeshi Matsui, Kanagawa-ken (JP); Shigemasa Itabashi, Kanagawa-ken (JP); Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 29 days.

(21) Appl. No.: 10/237,858

(22) Filed: Sep. 10, 2002

(65) Prior Publication Data

US 2003/0053724 A1 Mar. 20, 2003

(30) Foreign Application Priority Data

Sep. 20, 2001 (JP) ........................ 2001/286106

(51) Int. Cl.$^7$ .............................................. F16C 29/06
(52) U.S. Cl. ........................................................ 384/45
(58) Field of Search ..................................... 384/43, 45

(56) References Cited

U.S. PATENT DOCUMENTS

| | | | | |
|---|---|---|---|---|
| 5,800,064 A | * | 9/1998 | Ohya | 384/44 |
| 6,210,039 B1 | * | 4/2001 | Teramachi | 384/453 |
| 6,318,895 B1 | * | 11/2001 | Menges | 384/45 |
| 6,517,244 B2 | * | 2/2003 | Ishihara | 384/13 |
| 6,524,003 B2 | * | 2/2003 | Michioka et al. | 384/45 |

FOREIGN PATENT DOCUMENTS

| | | |
|---|---|---|
| DE | 196 13 626 | 10/1997 |
| EP | 0 971 140 | 1/1999 |
| JP | 136805/1986 | 6/1986 |
| JP | 161354/2000 | 6/2000 |
| JP | 82469/2001 | 3/2001 |
| WO | PCT 00 08344 | 1/2000 |

* cited by examiner

*Primary Examiner*—Thomas R. Hannon
(74) *Attorney, Agent, or Firm*—Browdy and Neimark, P.L.L.C.

(57) ABSTRACT

A linear motion guide unit is disclosed in which a joint tube connects between a turnaround and a return passage of a sleeve made of sintered resinous material to ensure smooth turnabout of rolling elements and further in which lubricant can be supplied to the rolling elements for a prolonged period, thereby refining the durability. A slider is comprised of a sleeve for a return passage held with clearance fit in a through-hole of a carriage in a way lining major area of the through-hole with only forward and aft ends of the through-hole being left naked, a spacer with a lug having a radially inside curved half for a turnaround and an inside part for a joint tube to make up for any one end of the return passage joining with the radially inside curved half, and an end cap having a radially outside half for the turnaround and an outside part for the joint tube to make up for any one end of the return passage joining with the radially outside curved half.

10 Claims, 7 Drawing Sheets

US 6,729,761 B2

LINEAR MOTION GUIDE UNIT WITH JOINT TUBE BETWEEN RETURN PASSAGE AND TURNAROUND

BACKGROUND OF THE INVENTION

1. Field of the Invention

The present invention relates to a linear motion guide unit envisaged to treat well high speed and high cycle in modern advanced machines such as semiconductor manufacturing equipments, industrial robots, engines, and so on, and more particularly a linear motion guide unit in which sintered resinous material of porous structure is installed in a carriage to provide a return passage therein while a joint tube communicates the return passage with turnarounds formed in the end caps.

2. Description of the Prior Art

The conventional linear motion guide units are commonly so constructed that a slider is movable relatively of an elongated track rail through many rolling elements, which are allowed to run through recirculating circuits comprised of load areas of raceways defined between the track rail and the slider, and non-loaded areas including turnarounds in end caps and return passages in a carriage in the slider. To help prevent metal-to-metal direct contact between the rolling elements and the recirculating circuits thereby to make certain of the rated durability of the linear motion guide units, it is necessary to continue constantly supplying the rolling elements and the recirculating circuits with lubricant to ensure keep lubrication between the rolling elements and the recirculating circuits. Secure lubrication between the recirculating circuits and the rolling elements is usually realized by periodic replenishment of lubricant.

Recently remarkable needs in reduction of expenditure on maintenance activities as well as in energy savings have given birth to various advanced machines such as semiconductor manufacturing equipments, industrial robots, engines, and so on, which can operate on maintenance-free. Correspondingly, the linear motion guide units to be used in the machinery are also counted on meeting with needs of maintenance-free lubrication. Especially, the linear motion guide units expected incorporated in the semiconductor manufacturing equipment, and so on, which conform the clean-room specifications must meet demands to adopt specific substances and/or designs that might yield little or no debris or cutting. Moreover, it is inevitable to limit the amount of lubricant used as least as possible since fine mist of lubricant might contaminates the atmosphere in the clean room.

A prior linear motion guide unit is disclosed in Japanese Patent Laid-Open No. 161354/2000, in which a ball-recirculating circuit is composed of a linear area bored in a carriage of a slider, and a curved area formed in an end cap, and the linear area is connected with the curved area through a socket-and-spigot joint that is made up of a hollow spigot end to extend an open end of the curved area into the linear area of the carriage, and a receptacle formed in an open end of the linear area to receive and fit over the spigot end. With the prior linear motion guide unit constructed as stated above, the end cap is made with a roughly cylindrical spigot while the carriage is made with a roughly socket to receive therein the spigot to communicate the linear area in the carriage with the curved linear area in the end cap to complete the ball-circulating circuit. In the prior linear motion guide unit, however, the linear area in the ball-recirculating circuit has no sintered resinous material as will be recited later, and moreover a guide member to define a radially inside curved area, because made apart from the end cap, has to be assembled into the end cap in conformity with the curved area in the end cap. It will be said this construction is unfit for the machines that need maintenance-free operation.

Another conventional linear motion guide unit is disclosed in Japanese Patent Laid-Open No. 136805/1986, in which a circulating circuit provided by combination of a slider with a guide rail is made up of a load raceway defined between a raceway groove on the guide rail and a raceway groove in a carriage of the slider, a return passage bored in the carriage in parallel with the load raceway, and curved ways formed in end caps of the slider one to each end cap. The return passage is made with a tube fit forcible into a hole drilled through the carriage. However, since the tube for the return passage is forcibly fit in the through-hole in the carriage, replacement with new one is very tough job.

Although but the prior linear motion guide units recited just above can operate successfully with no application of lubricant so long as used under light loads in the clean room specifications, they do not always serve well for the recently advanced machinery that has become increasingly higher in speed and oscillation. With the prior lubricant-containing polymer member availed for the conventional linear motion guide units, the polymer should be molded while being mixed with lubricating oil. In addition, the lubricant-containing polymer member, because of lacking the necessary strength in itself and of itself, has to be reinforced when incorporated really in the linear motion guide units. To cope with these disadvantages, the linear motion guide unit has inevitably become sophisticated in construction and highly advanced technology has been needed. With the construction in which the lubricating plates were mounted on the slider to make sliding engagement with the track rail, there is the problem that the slider has caused large frictional resistance when it was applied to machinery high in speed and oscillation.

Modern advanced machinery has a tendency to get higher in working speed and oscillation. These days, to deal with the tendency, the linear motion guide unit in which a return passage is made with a sintered resinous material of porous structure has been used in practice. An example of the linear motion guide unit having the return passage of sintered resinous material of porous structure stated just above is disclosed in, for example Japanese Patent Laid-Open No. 82469/2001, which is a senior application of the same applicant. With the linear motion guide unit recited earlier, the return passage bored in the slider is lined with sintered resinous material of porous structure, which can make certain of supplying the rolling elements with lubricant for a prolonged period, refining the slider in durability. The slider movable relatively to the track rail by virtue of the rolling elements is made therein with a through-hole in which a sleeve of the sintered resinous material having porous structure fits to form a return passage encircled with the sintered resinous material. Grease, lubricating oil and so on is absorbed in the porous structure of the sintered resinous material in a way continuing to be supplied for a long period onto the rolling elements running through the return passage, thereby lubricating the raceway via the rolling elements to improve the slider in durability as well as reduce the sliding resistance that is encountered when the slider moves on the track rail.

Thus, it may be worthwhile developing a linear motion guide unit continuing to supply the rolling elements with lubricant, thereby making certain of smooth running of the rolling elements for a prolonged period. To this end, it remains a major challenge to provide a linear motion guide unit in which the rolling elements running through the return passage in the slider are allowed to roll smoothly at a joining area of the return passage together with the associated turnaround, and the material fit in the through-hole in carriage of the slider to define the return passage has a property of self-lubrication of lubricating oil onto the rolling elements and also a strength enough of itself to need not to be reinforced with any other means.

SUMMARY OF THE INVENTION

The present invention has for its primary object to overcome the challenge as described just above, especially provide a linear motion guide unit in which a sleeve of sintered resinous material capable of impregnated with lubricant fits in a through-hole bored in a carriage to form a return passage, and a joint tube is applied at a junction of a turnaround in an end cap with any one of forward and aft ends of the sleeve to make sure of smooth rolling of the rolling elements at the junction. The present invention provides a linear motion guide unit made free from maintenance such as periodic application of lubricant and/or suppliance of lubricating oil to the rolling elements running through the recirculating circuit made up of a load raceway, turnarounds and a return passage, even under the severe operating conditions in atmosphere and/or subjected load. The present invention also provides a linear motion guide unit in which the joint tube applied at a junction of the turnaround with the return passage contributes to reducing the sliding resistance that might be encountered when the rolling elements run through the recirculating circuit used in the high-speed, high-cycle machines, thereby realizing inexpensive lubrication.

The present invention is concerned with a linear motion guide unit comprising, a track rail provided on sidewise opposing sides thereof with first lengthwise raceway grooves, one to each side, a slider having second raceway grooves confronting the first raceway grooves and fitting over the track rail in a way movable lengthwise with respect to the track rail, and more than one rolling element allowed to run through load raceways defined between the first raceway grooves on the track rail and the second raceway grooves in the slider, wherein the slider is comprised of a carriage having the second raceway grooves thereon and through-holes extending therein along the second raceway grooves, sleeves fit in the through-holes, one to each through-hole, in a way lining the through-hole with only forward and aft ends of the through-hole being left naked, thereby providing a major area of a return passage, spacers arranged on forward and aft ends of the carriage, one to each end, the spacers each having a radially inside curved half for a turnaround to connect the load raceway and the return passage and also having an inside part for a joint tube to make up for any one end of the return passage joining with the radially inside curved half after fitted in the naked end of the through-hole, and end caps arranged on outside ends of the spacers, one to each outside end, the end caps each having a radially outside for the turnaround and also having an outside part for the joint tube to make up for any one end of the return passage joining with the radially outside curved half after fitted in the naked end of the through-hole.

In an aspect of the present invention, there is disclosed a linear motion guide unit in which the sleeve fit in the through-hole in the carriage is made of sintered resinous material of porous structure capable of carrying lubricant therein. In another aspect of the present invention there is disclosed a linear motion guide unit in which the sleeve is made in such a contour of circle in cross section as to conform to the through-hole in the carriage and also has a linear hole therein provide the return passage.

In another aspect of the present invention, moreover, there is disclosed a linear motion guide unit in which the inside part of the spacer and the outside part of the end cap are matched up together to form the joint tube that makes end-to-end abutment against the sleeve to make up for the end of the return passage to complete the return passage lying in alignment with the linear hole in the sleeve to connect between the return passage and the turnaround.

In a further another aspect of the present invention there is disclosed a linear motion guide unit in which the inside part is made to account for a minor part less than half the circle in cross section of the joint tube, while the outside part is a major part larger than half the circle of the joint tube, so that the inside and outside parts are joined together to form the joint tube at their mating edges lying lopsided with respect to the plane lying on the axis of the joint tube. In another aspect of the present invention there is disclosed a linear motion guide unit in which the joint tube made up of the inside and outside parts is made in a straight tube.

In a further another aspect of the present invention there is disclosed a linear motion guide unit in which the radially inside curved half for the turnaround on the spacer corresponds to the load raceway, while the inside part for the joint tube corresponds to return passage. In another aspect of the present invention there is disclosed a linear motion guide unit in which the spacer is comprised of a transverse body interposed between the end cap and the spacer, and lugs integral with the body and each having the radially inside curved half for the turnaround and the inside part for the joint tube. In another aspect of the present invention there is disclosed a linear motion guide unit in which end seals are mounted on end faces of the end caps, one to each end face.

With the linear motion guide unit of the present invention, especially, the carriage is made of metal whereas the sleeve for return passage discussed here is made of sintered resinous material relatively fragile compared with metal. Nevertheless, the sleeve is held in the through-hole with zero fit in which there is no clearance between the sleeve and the through-hole in the metal carriage and/or with clearance fit, that is, with any clearance fit having any positive or zero allowance, instead of force fit in which interference always results on assembly of the sleeve in the through-hole. Thus, there is no occurrence of breakage such as cracks in the sleeve for return passage. Moreover, the clearance fit on assembly of the sleeve in the carriage contributes to no possibility of the occurrence of any breakage in the sleeve, which might result from the difference in thermal expansion between the carriage and the sleeve, thus making ensure high durability of the sleeve for return passage.

With the linear motion guide unit constructed as stated earlier, the joint tube made up of the outside part on the end cap and the outside part on the spacer is effective to make certain of extremely steady junction of the return passage with the turnaround, and connect between the return passage and the turnaround with precision and smoothness to thereby reduce the sliding resistance that is encountered when the rolling elements run over the junction, helping the rolling elements roll smoothly. That is to say, according to the linear motion guide unit of the present invention, the joint tubes are arranged to make end-to-end abutment against the forward and aft edge of the sleeve to complete the return passage, and in doing so establish the smooth passage in the whole time of recirculation, thus making sure the rolling elements smoothly run through the overall recirculating circuit.

The sleeve for return passage is made of sintered resinous material of porous structure taking on the function of an absorber readily soaking up lubricating oil or grease. Thus, the sleeve soaked with the lubricating oil or grease can perform proper lubrication of the rolling elements. That is to say, the lubricating oil or grease absorbed and reserved in the porous structure is transferred little by little to the rolling elements when making contact with the rolling elements. The lubricant adhered on the rolling elements is then applied to the load raceways as the rolling elements run through the load raceways. The sleeve for return passage made of sintered resinous material has sufficient strength in itself and on itself even with no other reinforcement. Moreover, the sintered resinous material used in the present invention, as being less subjected to wear, is tough to clogging in the porous structure, which might be caused by cuttings, debris, and so on occurring due to wear, thereby to make it possible to continue supplying over a prolonged period the rolling elements with lubricant, which is reserved in the porous structure.

Moreover, the sleeve made of sintered resinous material is flanked by the joint tubes at the forward and aft ends thereof. This construction can keep the sintered resinous material of the sleeve away from the threat that the balls might batter away on the sleeve at the entrance to the return passage, helping the sleeve of sintered resinous material survive for a long period.

Consequently the linear motion guide unit of the present invention is made free from maintenance such as periodic application and/or suppliance of lubricant over the prolonged period. Until the lubricant is consumed transferred from the return passage to the rolling elements, there is no need to replenish the return passage with lubricant. Moreover, the linear motion guide unit of the present invention lessens the sliding resistance at the load raceway to the extent conforming to the high speed and high cycle of the machines.

Other aspect and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
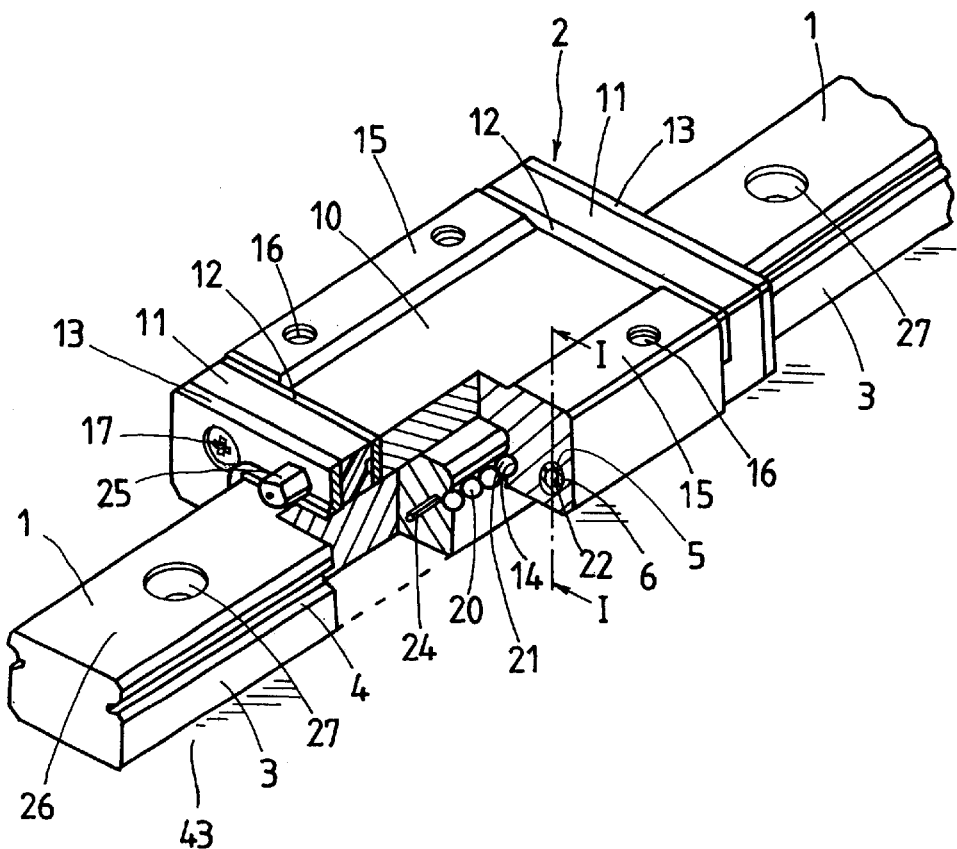
FIG. 1 is a perspective view, partially broken away, showing a preferred embodiment of a linear motion guide unit according to the present invention.

Referring now in detail to the drawings, a linear motion guide unit according to the present invention will be explained below. This linear motion guide unit will be interposed between any confronting parts or components movable relatively to one another in machinery such as semiconductor manufacturing equipments, industrial robots, machine tools, engines, and so on to make sure of smooth relative travel between the confronting parts or components. The linear motion guide unit of the present invention is chiefly marked by a joint tube to connect a turnaround with a return passage.

The linear motion guide unit of the present invention is applicable between any relatively traveling components: machine bed and table confronting each other and movable with respect to one another, and mainly comprised of an elongated track rail 1 having lengthwise-extended raceway grooves 4 (later called first raceway groove) on sides 3 thereof, one raceway groove to each side, and a slider 2 that fits astride over and conforms the track rail 1 for sliding movement. The track rail 1 is made on the top 26 thereof with fasten down bolt holes 6, which are used to fasten the track rail 1 to a base 43 such as a machine bed, and so on. The slider 2 fits over and conforms the track rail 1 for linear movement relatively to the track rail 1 and has fore-and-aft raceway grooves 14 (later called second raceway groove), which are opposed to the first raceway grooves 4 on the track rail 1. The slider 2 is allowed to travel relatively to the track rail 1 by virtue of rolling elements or balls 20 running through the load raceways 21 each of which is defined between the first raceway groove 4 on the track rail 1 and the second raceway groove 14 in the slider 2. End seals 13 are arranged over forward and aft outside faces 38 of end caps 11, one to each end cap 11.

The slider 2 is mainly comprised of a carriage 10 formed to fit astride over the top 26 of the track rail 1 and conform to track rail 1, end caps 11 attached to forward and aft ends of the carriage 10, one to each end, spacers 12 each interposed between any one of the end caps 11 and the carriage 10, and end seals 13 arranged over end faces of the end caps 11 to cover clearances between the track rail 1 and the end caps 11. The end cap 11 has a positioning dowel pin 37 that serves to bring the end cap 11 into positional alignment with the end seal 13. To joint the end seal 13 on the carriage 10 together with the end cap 11 and the spacer 12, a fastening bolt 17 extends through a bolt hole 45 in the end cap 11 and a bolt hole 46 in the spacer 12 then, followed by screwed into a threaded hole 44 drilled or cored in the carriage 10. The carriage 10 of the slider 2 has the raceway grooves 14 and fore-and-aft through-holes 5 to provide return passages 22 extending in parallel with the raceway grooves 14. The carriage 10 is also provided with a threaded hole 16 opened to a top surface 15 thereof to be available when mounted to a machine table. Bottom seals 17, not shown, are arranged at both the bottoms of the carriage 10 and the end caps 11 to cover clearance between them and the lengthwise sides 3 of the track rail 1.

The rolling elements or balls 20 are allowed to run through the load raceway 21 defined between the first raceway groove 4 on the track rail 1 and the second raceway groove 14 in the carriage 10 to travel the slider 2 with respect to the track rail 1. Retainer bands 24 are to keep the balls 20 against falling off from the carriage 10 when the slider 2 is disassembled from the track rail 1. Balls 20, after having rolled through the load raceway 21, are transferred from the load raceway 21 to the turnaround 19 in any one of the forward and aft end caps 11 under guidance of a scooping beak 35 made in the end cap 11, and then roll through the turnaround 19 into the return passage 22 in the carriage 10 via a joint tube 48, followed by transferring from the return passage 22 to another turnaround 19 via another joint tube 48 and going back to the first load raceway 21 to roll through in a recirculating manner. In this instance, the turnarounds 19 and the return passage 22 make up of a non-loaded raceway. A grease nipple 25 to supply the balls 20 with lubricant or lubricating oil is arranged to any one of the end caps 11 with projecting outwards the associated end seal 13. Lubricant charged through the grease nipple 25 flows through an oil hole 34 and oil paths 33 to be applied on the balls 20 then, followed by lubricating the recirculating circuit after the balls 20 entraining lubricant thereon roll through the turnarounds 19, return passage 22 and the load raceway 21.

The return passage 22 is provided inside a sleeve 6 of sintered resinous material, which is arranged in the carriage 10. Thus, the carriage 10 is made therein with a through-hole 5 having an inside diameter equivalent to the sum dimension of a passage diameter allowing the balls 20 to roll through there and a radial thickness of the sleeve 6, that is to say, to an overall diameter an outside diameter of the sleeve 6. The sleeve 6 fits in the through-hole 5 in such a way that forward and aft ends thereof make end-to-end abutment against the joint tubes, one to each joint tube, to keep the sleeve 6 against lengthwise movement along the through-hole 5.

Figure 14:
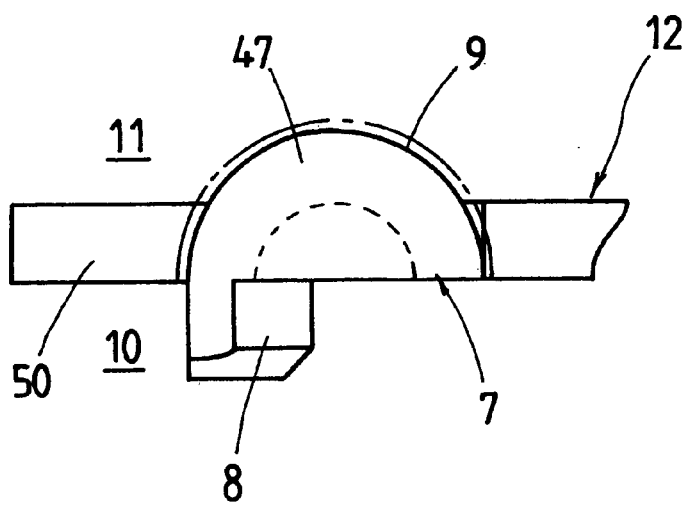
FIG. 14 is a fragmentary bottom view of reader's left half of the spacer shown in FIG. 12.
Figure 15:
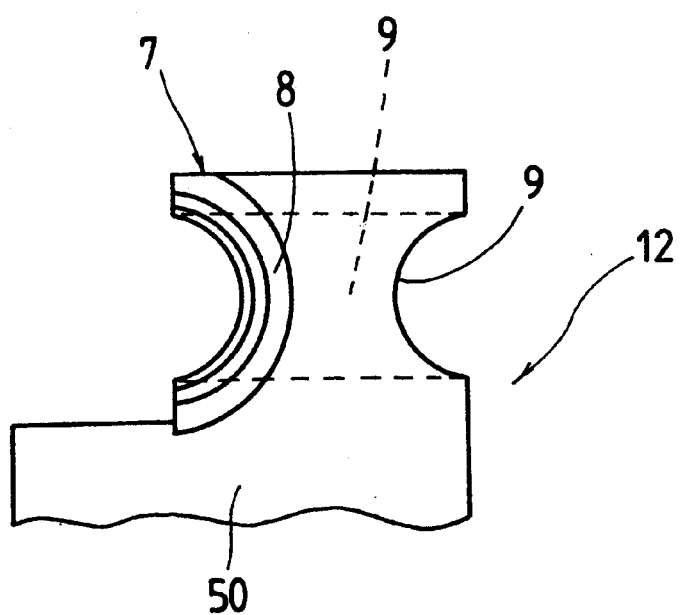
FIG. 15 is a fragmentary bottom view of the spacer of FIG. 14.

The slider 2 is comprised of a carriage 10 made with the through-hole 5, the sleeve 6 accounting for a major mid-area of the return passage 22, spacers 12 lying on forward and aft end 40 of the carriage 10, one to each end, and the end caps 11 arranged on the outside ends 39 of the spacers 12, one to each spacer 12. Upon making face-to-face abutment of the end cap 11 against the outside end 39 of the associated spacer 12, the end cap 11 is held in place with respect to the associated spacer 12, with a concavity 36 in the end cap 11 fitting over and conforming to an associated convexity 47 on a lug 7 of the spacer 12 shown in detail in FIG. 14. In this assembled relation of the end cap 11 with the spacer 12, an inside part 8 on the lug 7 of the spacer 12 confronts an outside part 22 in the end cap 11 in alignment with one another to form the joint tube 48, while an inside curved half 9 of the lug 7 of the spacer 12 is placed in radially opposite relation with an outside curved half 29 in the end cap 11 to define the turnaround 19 between them.

The sleeve 6 to provide the return passage 22, because of not so long in fore-and-aft length as to reach forward and aft ends of the through-hole 5 in the carriage 10, fits in the through-hole 5, with lengthwise opposing end areas 31 of the through-hole 5 being left naked. The spacer 12 includes the radially inside curved half 9 for the turnaround 19 to connect between the load raceway 21 and the return passage 22, and the sidewise inside part 8 for the joint tube 48 that will fit in the naked end area 31 of the through-hole 5 to provide a passage end 49 filling in a discontinuity between the sleeve 6 of the return passage 22 and the radially outside curved half 29 of the turnaround 19. Moreover, the end cap 11 has the radially outside curved half 29 for the turnaround 19, and the sidewise outside part 28 for the joint tube 48 that will fit in the naked end area 31 of the through-hole 5, filling in a discontinuity 49 between the sleeve 6 of the return passage 22 and the radially outside curved half 29 of the turnaround 19.

Figure 7:
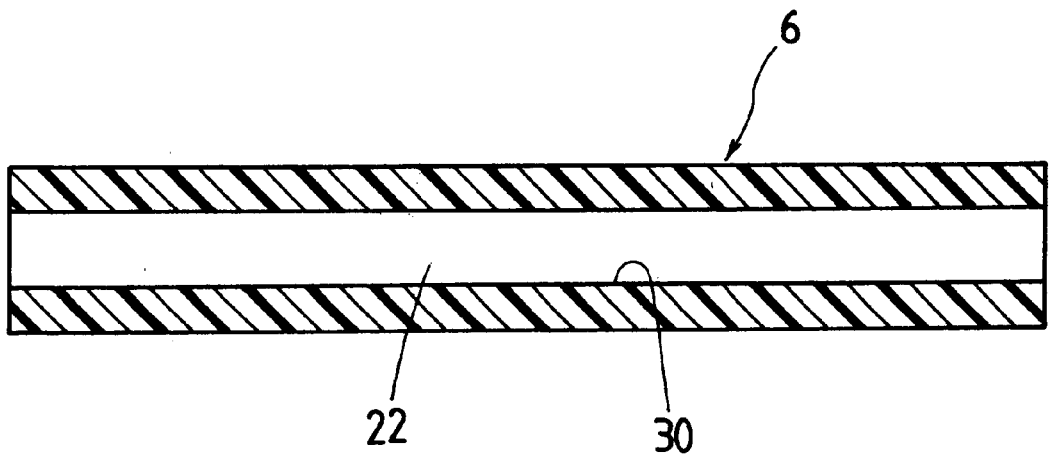
FIG. 7 is a longitudinal section of the sleeve shown in FIG. 6.
Figure 8:
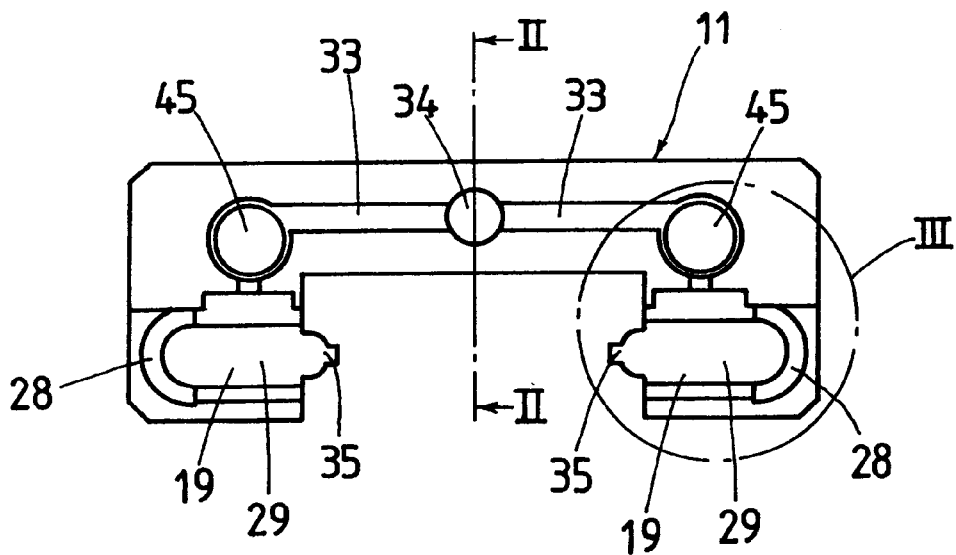
FIG. 8 is a rear elevation, viewed from the side of the carriage, of an end cap for the linear motion guide unit of FIG. 1.
Figure 9:
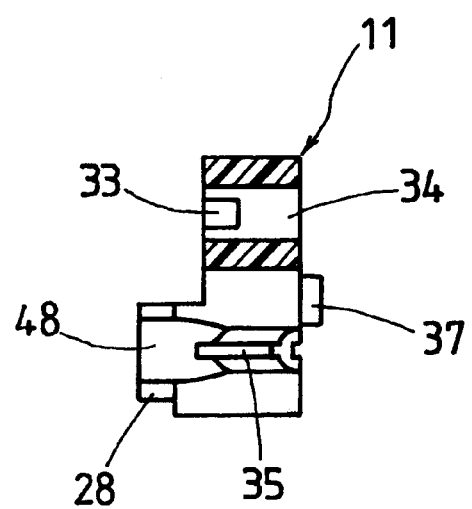
FIG. 9 is a traverse section of the end cap of FIG. 8, the view being taken along the line II—II of that figure.
Figure 10:
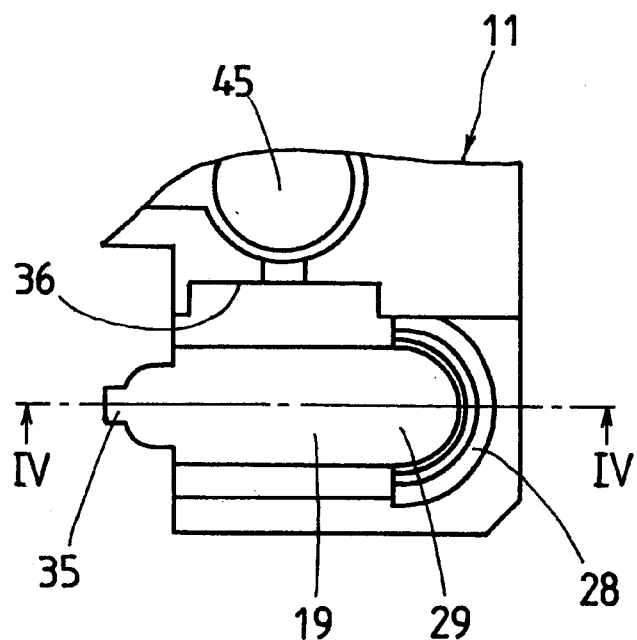
FIG. 10 is an enlarged fragmentary rear view of an area surrounded by a circle III of FIG. 8.
Figure 11:
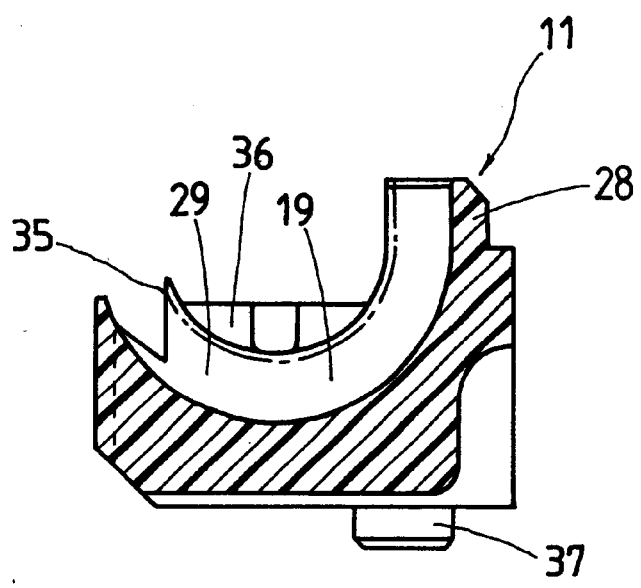
FIG. 11 is a traverse section of the end cap, which is viewed on the plane taken along the line IV—IV of FIG. 10.
Figure 12:
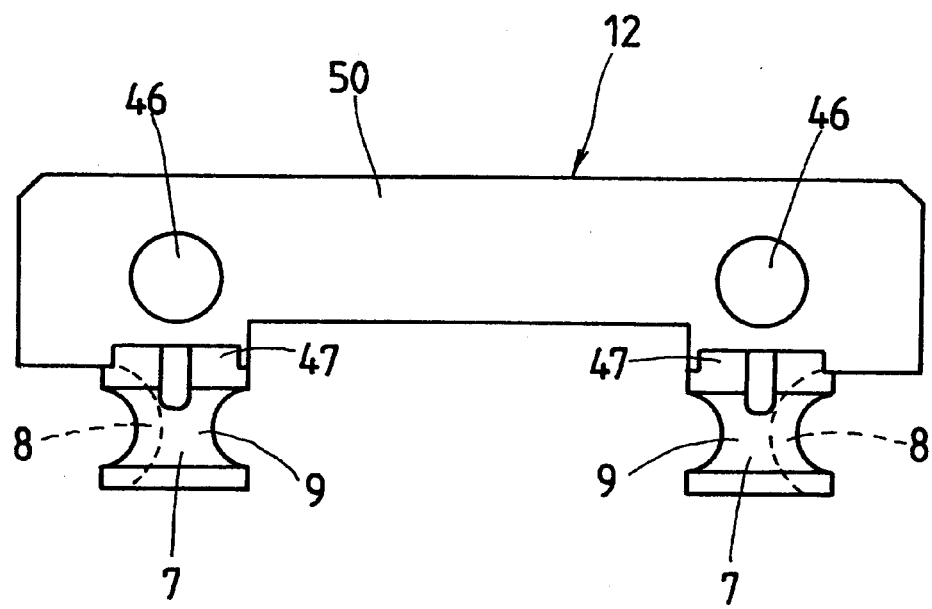
FIG. 12 is a front elevation, viewed from the side of the end cap, of a spacer incorporated in the linear motion guide unit of FIG. 1.
Figure 13:
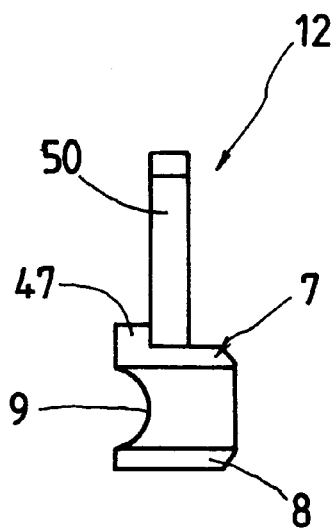
FIG. 13 is a side elevation showing the spacer of FIG. 12.

The sleeve 6 for the return passage 22 is designed to fit in the through-hole 5 in the carriage 10 and made of sintered resinous material of porous structure having a property enabling to carry lubricant in itself. The sleeve 6 is made in a circular outside configuration conforming to the through-hole 5 in the carriage 10, and provided therein a linear hole 30 as shown in FIG. 7 to serve as the return passage 22. The joint tube 48 to connect the return passage 22 with the turnaround 19 is made up of the inside part 8 on the spacer 12 and the outside part 28 in the end cap 11 confronting one another, and provides the passage end 49 that fits in the necked end area 31 in the through-hole 5 extending beyond the associated edge of the sleeve 6, lying in continuity with the linear hole 30 in the sleeve 3 to complete the return passage 22.

Figure 3:
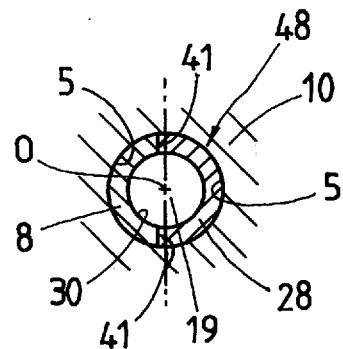
FIG. 3 is a traverse cross section taken on the plane of the line V—V of FIG. 2.
Figure 4:
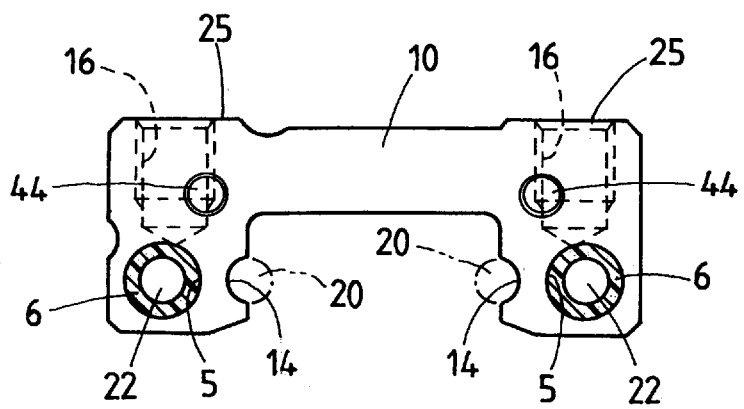
FIG. 4 is a front elevation showing a carriage having therein the return passages for the linear motion guide unit of FIG. 1.
Figure 5:
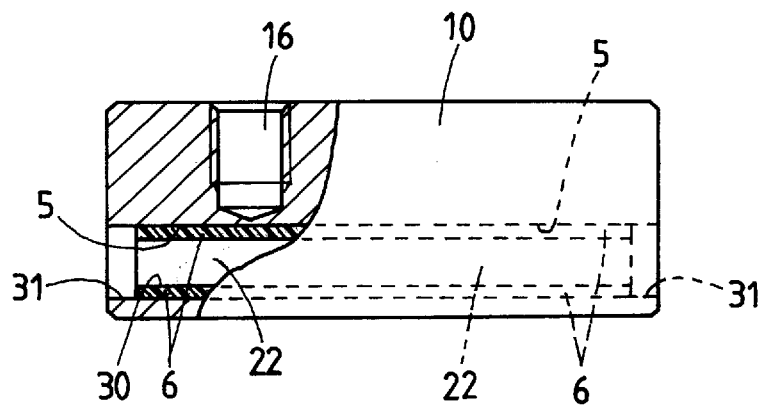
FIG. 5 is a side elevation, partially broken away, of the carriage of FIG. 4.
Figure 6:
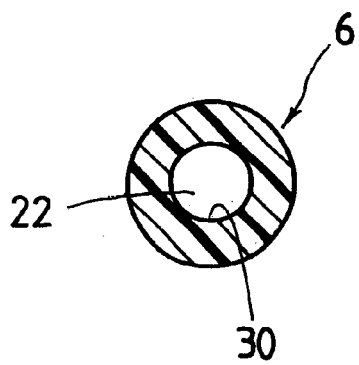
FIG. 6 is a cross section showing a sleeve to be fit in a through-hole in the carriage to make the return passage.

As shown in FIG. 3, the sidewise inside part 8 on the spacer 12 is made to make up a minor part less than half the circle in cross section of the joint tube 48, while the sidewise outside part 28 makes up a major part larger than half the circle of the joint tube 48. Thus, the sidewise inside and outside parts 8 and 28 are joined together to form the joint tube 48 at their mating edges 41 lying lopsided with respect to the plane lying on the axis O of the joint tube 48. This construction has the advantage of preventing the balls 20 from concurrently making contact with both the radially opposite mating edges 41, thereby making certain of smooth rolling of the balls 20. As an alternative, it will be appreciated that the inside and outside parts 8 and 28 may be made semicircular halves equal with each other in circular dimension. Moreover, the inside and outside parts 8 and 28 are formed so as to provide the just straight joint tube after joined together.

Since the load raceways 21 defined by the confronting raceway grooves 4, 41 are arranged on the widthwise opposing sides 3 of the track rail 1, one on each side, the radially inside curved halves 9 for the turnarounds 19 spaced apart widthwise from each other on the spacer 12 correspond the load raceways 21, respectively, and the sidewise inside parts 8 on the spacer 12 are associated with the return passages 22, respectively.

The spacer 12 is comprised of a transverse body 50 to be interposed between the end cap 11 and the carriage 10, and the lugs 7 integral with the body 50 and each having the radially inside curved half 9 for the turnaround 19 and the inside part 8 for the joint tube 48.

With the linear motion guide unit constructed as stated earlier, the joint tubes 48 to reach the turnarounds 19 fit in the through-hole 5 in a way making end-to-end abutment against the forward and aft edges of the sleeve 6, one to each edge, which accounts for the major mid-area of the return passage 22. Installation of the joint tube 48 at the forward and aft edges of the sleeve 6 contributes to making a junction of the turnaround with the return passage 22 within the through-hole 5, thereby making sure of smooth recirculation of the balls 20. Moreover, the joint tube 48, since stretching the length of about one ball from end to end, can alleviate the threat that the balls 20 might batter away on the sleeve 6 at the entrance to the return passage 22, helping the sleeve 6 of sintered resinous material survive for a long period. What is more, the spacer 12 is made therein with more than one lug 7 for providing the joint tube 48, and therefore only fitting the convexity 47 of the lug 7 on the spacer 12 in the concavity 36 in the end cap 11 is sufficient to bring more than one inside part 8 into engagement with their associated outside parts 28 in the end cap 11 at a time. Thus, the spacer 12 discussed here does not need any troublesome work of matching up more than one inside part 8 and the distinct outside parts 28 one at a time.

Figure 2:
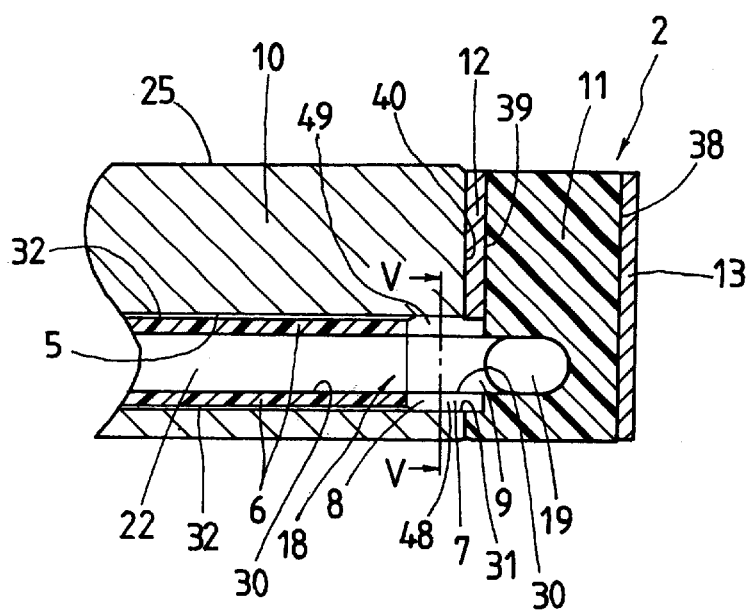
FIG. 2 is a fragmentary section showing a return passage in the linear motion guide unit of FIG. 1, the view being taken on the plane of the line I—I of that figure.

With the linear motion guide unit of the present invention, to avoid any breakage such as a crack or the like so on that might happen in the sintered resinous material when the sleeve 6 of sintered resinous material is forcibly driven into the through-hole 5, the sleeve 6 is held with zero fit in which there is no clearance between the sleeve 6 and the through-hole 5 in the metal carriage 10 and/or with clearance fit, that is, with any clearance fit having any positive or zero allowance, instead of interference fit in which the sleeve 6 is driven forcibly with negative allowance. In the embodiment stated earlier, the sleeve 6 was fitted in the through-hole 5 in the carriage 10 with a clearance 32 of about from 0 to 0.15 mm. The sleeve 6 for the return passage, because of making end-to-end abutment at fore-and-aft edges thereof against the joint tubes 48 as shown in FIG. 2, is allowed to fit in with the clearance stated just above. As the sleeve is not subjected to the interference fit in the through-hole 5 in the carriage 10, the clearance 32 of some 0 to 0.15 mm between the mating parts is sufficient to stave off the occurrence of any breakage in the sleeve 6 owing to the difference in thermal expansion between the carriage 10 and the sleeve 6.

Since the sleeve 6 is made of sintered resinous material, the linear hole 30 bored in the sleeve 6 to provide the return passage 22 is resistant well against any deformation, for example a shrinkage in inside diameter, which might otherwise occur upon a shortage of lubricant, thus effective to continue keeping smooth supply of lubricant to the balls 20, making certain of good recirculation of the balls 20. The return passage 22, although lying concentrically in the through-hole 5 in the carriage 10 of the embodiment discussed here, may of course be arranged eccentrically.

As an alternative, the sleeve 6 fit in the through-hole 5 in the carriage 10, although not shown, can be made in any one of various constructions, for example disclosed in Japanese Patent Laid-Open No. 82469/2001. Moreover, although but sleeve 6 for the return passage in the linear motion guide unit of the present invention is held in the through-hole 5 in the carriage 10 with either zero fit in which there is no clearance between the sleeve 6 and the through-hole 5 or with clearance fit, that is, with any clearance fit having any positive or zero allowance, it will be appreciated that the sleeve 6 may be made in any one of simply straight sleeve construction, slit sleeve construction with lengthwise slits to reserve lubricant therein, dumbbell-like sleeve construction with lengthwise opposite big ends and slim mid-portion having slits therein, and an alternative sleeve construction in which there is provided big ends, a big rib midway between the big ends, and slim areas each lying between the big rib and any one of the big ends and also having slits therein.

What is claimed is:

1. A linear motion guide unit comprising, a track rail provided on sidewise opposing sides thereof with first lengthwise raceway grooves, one to each side, a slider having second raceway grooves confronting the first raceway grooves and fitting over the track rail in a way movable lengthwise with respect to the track rail, and more than one rolling element allowed to run through load raceways defined between the first raceway grooves on the track rail and the second raceway grooves in the slider, wherein the slider is comprised of a carriage having the second raceway grooves thereon and through-holes extending therein along the second raceway grooves, sleeves fit in the through-holes, one to each through-hole, in a way lining the through-hole with only forward and aft ends of the through-hole being left naked, thereby providing a major area of a return passage, spacers arranged on forward and aft ends of the carriage, one to each end, the spacers each having a radially inside curved half for a turnaround to connect the load raceway and the return passage and also having an inside part for a joint tube to make up for any one end of the return passage joining with the radially inside curved half after fitted in the naked end of the through-hole, and end caps arranged on outside ends of the spacers, one to each outside end, the end caps each having a radially outside for the turnaround and also having an outside part for the joint tube to make up for any one end of the return passage joining with the radially outside curved half after fitted in the naked end of the through-hole.

2. A linear motion guide unit constructed as defined in claim 1, wherein the sleeve fit in the through-hole in the carriage is made of sintered resinous material of porous structure capable of carrying lubricant therein.

3. A linear motion guide unit constructed as defined in claim 2, wherein the sleeve is made in such a contour of circle in cross section as to conform to the through-hole in the carriage and also has a linear hole therein provide the return passage.

4. A linear motion guide unit constructed as defined in claim 1, wherein the inside part of the spacer and the outside part of the end cap are matched up together to form the joint tube that makes end-to-end abutment against the sleeve to make up for the end of the return passage to complete the return passage lying in alignment with the linear hole in the sleeve to connect between the return passage and the turnaround.

5. A linear motion guide unit constructed as defined in claim 4, wherein the inside part is made to account for a minor part less than half the circle in cross section of the joint tube, while the outside part is a major part larger than half the circle of the joint tube, so that the inside and outside parts are joined together to form the joint tube at their mating edges lying lopsided with respect to the plane lying on the axis of the joint tube.

6. A linear motion guide unit constructed as defined in claim 1, wherein the joint tube made up of the inside and outside parts is made in a straight tube.

7. A linear motion guide unit constructed as defined in claim 1, wherein the radially inside curved half for the turnaround on the spacer corresponds to the load raceway, while the inside part for the joint tube corresponds to return passage.

8. A linear motion guide unit constructed as defined in claim 1, wherein the spacer is comprised of a traverse body interposed between the end cap and the spacer, and lugs integral with the body and each having the radially inside curved half for the turnaround and the inside part for the joint tube.

9. A linear motion guide unit constructed as defined in claim 1, wherein the sleeve is held in the through-hole in the carriage with any clearance fit having any of positive and zero allowance.

10. A linear motion guide unit constructed as defined in claim 1, wherein end seals are mounted on end faces of the end caps, one to each end face.

* * * * *